United States Patent [19]
Feintuch

[11] 3,827,659
[45] Aug. 6, 1974

[54] CONTROL SYSTEM MONITORING APPARATUS HAVING MINIMAL NUISANCE ALARM CHARACTERISTICS

[75] Inventor: Martin William Feintuch, Paramus, N.J.

[73] Assignee: The Bendix Corporation, Teterboro, N.J.

[22] Filed: Mar. 7, 1973

[21] Appl. No.: 338,800

[52] U.S. Cl............... 244/77 M, 318/564, 318/565
[51] Int. Cl............................................. B64c 13/18
[58] Field of Search... 73/178 T; 235/150.2, 150.22; 244/77 R, 77 A, 77 M; 318/564–565, 583; 340/27 R; 343/108 R

[56] References Cited
UNITED STATES PATENTS

| | | | |
|---|---|---|---|
| 3,266,040 | 8/1966 | Doniger et al............... | 244/77 A X |
| 3,454,849 | 7/1969 | Kirchhein et al............. | 244/77 M X |
| 3,462,661 | 8/1969 | Nelson............................ | 318/564 X |
| 3,505,641 | 4/1970 | Boskovich..................... | 244/77 M X |
| 3,551,776 | 12/1970 | Tawfik et al..................... | 318/565 X |

FOREIGN PATENTS OR APPLICATIONS

| | | | |
|---|---|---|---|
| 1,502,774 | 11/1967 | France............................ | 244/77 M |

Primary Examiner—George E. A. Halvosa
Assistant Examiner—Stephen G. Kunin
Attorney, Agent, or Firm—Anthony F. Cuoco; S. H. Hartz

[57] ABSTRACT

Apparatus for monitoring dual channel equipment such as used in aircraft control systems, and including apparatus for implementing the monitoring without sacrificing channel isolation while distinguishing between actual system failures and apparent failures due to tolerance build-ups.

4 Claims, 1 Drawing Figure

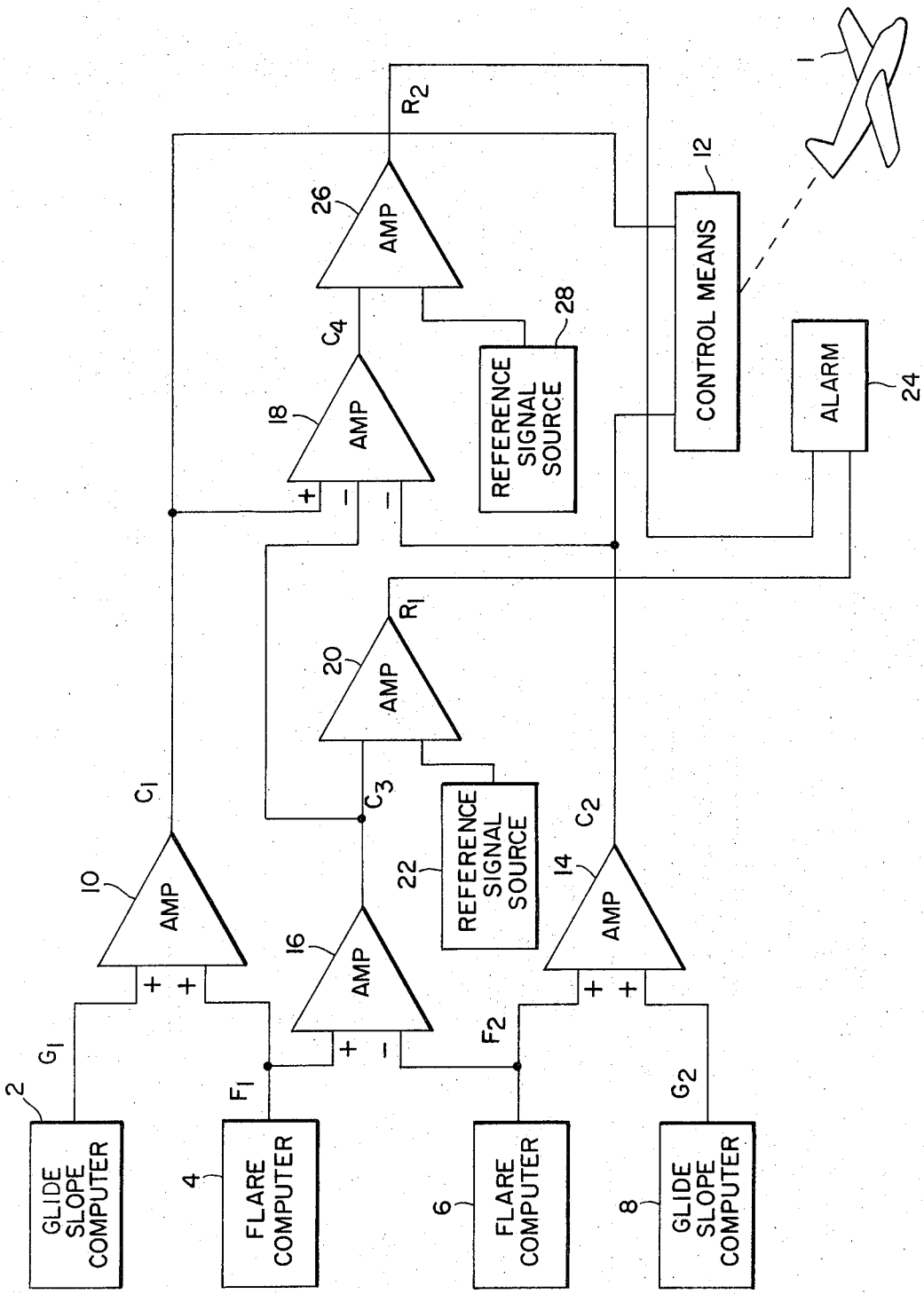

CONTROL SYSTEM MONITORING APPARATUS HAVING MINIMAL NUISANCE ALARM CHARACTERISTICS

BACKGROUND OF THE INVENTION

1. Field of the Invention

This invention relates to dual channel control systems and particularly to monitors for said systems. More particularly, this invention relates to monitors for dual channel control systems which maintain two end-to-end independent channels without sacrificing failure detection capability.

2. Description of the Prior Art

Flight Control systems of the dual channel type must be monitored to insure the success of missions such as automatic landing. It is necessary that the monitors for these systems have the capability of distinguishing between failures which might cause a catastrophic landing and apparent or nuisance failures caused by system tolerance build-ups. In prior art monitoring devices for dual channel systems, reduction of nuisance failures has been achieved by consolidation of the two channels. That is, at each comparison point subsequent signal paths receive their signal from only one channel. However, a disadvantage exists in equipment of this type in that only one end-to-end signal channel exists and the advantages of two channels such as inherent signal averaging and reduced susceptibility to passive failures is lost.

SUMMARY OF THE INVENTION

This invention contemplates monitoring apparatus for use with a system of the type providing first and second redundant control signals for affecting one control function and third and fourth redundant control signals for affecting another control function. The first and third control signals are combined to provide a first combined signal and the second and fourth control signals are combined to provide a second combined signal. Control is provided in response to the first and second combined signals. The third and fourth control signals are combined to provide a third combined signal which is compared to a reference signal for providing a first comparison signal. The third combined signal is combined with the first and second combined signals to provide a fourth combined signal which is compared to a reference signal for providing a second comparison signal. An alarm is actuated when one of the first and second comparison signals exceeds predetermined limits. The arrangement is such that the first comparison signal is sensitive to errors existing between the third and fourth control signals. The first combined signal is a function of the first and third control signals and the second combined signal is a function of the second and fourth control signals so that the second comparison signal is normally sensitive to the same errors as the first comparison signal plus additional errors. By combining the first and second combined signals with the third combined signal, the difference between the first and second control signals is cancelled from the difference between the first and second combined signals, and the second comparison signal is sensitive only to errors between the first and second control signals.

One object of this invention is to provide monitoring aparatus for a dual channel control system wherein the difference in signals at two similar points in the system does not affect the difference at similar points in the signal channels that the signals feed.

Another object of this invention is to minimize tolerance build-up while maintaining two end-to-end independent signal channels.

Another object of this invention is to minimize tolerance build-up without sacrificing actual failure detection capability.

Another object of this invention is to implement the monitoring without sacrificing channel isolation while distinguishing between actual system failures and apparent failures due to tolerance build-ups.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawing is for illustration purposes only and is not to be construed as defining the limits of the invention.

DESCRIPTION OF THE DRAWING

The single FIGURE in the drawing is a block diagram showing a control system and monitoring apparatus therefor according to the invention.

DESCRIPTION OF THE INVENTION

A system for controlling an aircraft 1 when landing the craft includes a flare control channel having flare computers 4 and 6 for providing redundant flare control signals $F_1$ and $F_2$, respectively, and a glide slope control channel having glide slope computers 2 and 8 for providing redundant glide slope control signals $G_1$ and $G_2$, respectively.

Flare control signal $F_1$ is combined with glide slope control signal $G_1$ in a positive sense by a combining amplifier 10 for providing a combined signal $C_1$. Signal $C_1$ is applied to a control means 12 which may be a conventional type servo system for operating the control surfaces (elevators) of aircraft 1. Flare control signal $F_2$ and glide slope control signal $G_2$ are combined in a positive sense by a combining amplifier 14 for providing a combined signal $C_2$. Signal $C_2$ is applied to control means 12 for operating the control surfaces (elevators) of the aircraft.

Signal $F_1$ from flare computer 4 and signal $F_2$ from flare computer 6 are applied in positive and negative senses, respectively, to a combining amplifier 16 and the combined signal $C_3$ therefrom is applied in a negative sense to a combining amplifier 18 which combines the signal with signal $C_1$ in a positive sense and with signal $C_2$ in a negative sense to provide a combined signal $C_4$.

Combined signal $C_3$ from amplifier 16 is applied to a comparison amplifier 20 and compared thereby with a reference signal from a reference signal source 22 to provide a comparison signal $R_1$. When signal $R_1$ exceeds predetermined positive and negative limits an alarm device 24 is actuated indicating a system failure.

Combined signal $C_4$ from amplifier 18 is applied to a comparison amplifier 26 which compares the signal with a reference signal from a reference signal source 28 to provide a comparison signal $R_2$. When signal $R_2$ exceeds predetermined positive and negative limits alarm device 24 is actuated indicating a system failure.

A two channel operative system exists when the signals from amplifiers 20 and 26 are within the predetermined limits.

OPERATION OF THE INVENTION

It will now be seen that amplifier 20 is sensitive to errors between control signals $F_1$ and $F_2$. Assuming that only signals $C_1$ and $C_2$ are applied to amplifier 18, then amplifier 26 would be sensitive only to errors existing between these signals. However, since signal $C_1$ is a function of signals $F_1$ and $G_1$ and signal $C_2$ is a function of signals $F_2$ and $G_2$, then it will be seen that amplifier 26 is sensitive to the same errors as amplifier 20 plus additional errors. By applying the output of amplifier 16 to amplifier 18 the difference between signals $F_1$ and $F_2$ is cancelled from the difference between signals $C_1$ and $C_2$ and amplifier 26 is sensitive only to errors existing between signals $G_1$ and $G_2$.

It will thus be seen that the aforenoted objects of the invention have been met. The signal difference between two similar points in the dual channel control system does not affect the difference in similar points in the signal channels that they feed. Moreover, reduced tolerance build-up has been achieved while maintaining two end-to-end independent channels, and without sacrificing actual failure capability. Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A dual channel control system, comprising:
   means for providing first and second redundant control signals for affecting one control function;
   means for providing third and fourth redundant control signals for affecting another control function;
   means for combining the first and third control signals to provide a first combined signal;
   means for combining the second and fourth control signals to provide a second combined signal;
   means for affecting control in response to the first and second combined signals;
   means for combining the third and fourth control signals to provide a third combined signal;
   means for providing a first reference signal;
   means for comparing the third combined signal and the first reference signal to provide a first comparison signal;
   means for combining the first, second and third combined signals to provide a fourth combined signal;
   means for providing a second reference signal;
   means for comparing the fourth combined signal and the second reference signal to provide a second comparison signal; and
   alarm means actuated when at least one of the first and second comparison signals exceeds predetermined limits.

2. A system as described by claim 1, wherein:
   the first means combines the first and third control signals by summing said signals in like senses; and
   the second means combines the second and fourth control signals by summing said signals in like senses.

3. A system as described by claim 1, wherein:
   the means for combining the third and fourth control signals sums said signals in opposite senses; and
   the means for combining the first, second and third combined signals sums the first and second combined signals in opposite senses and the third combined signal in the same sense as the second combined signal.

4. A dual channel system for controlling an aircraft when landing the craft, comprising:
   means for providing first and second redundant control signals for controlling glide slope of the aircraft;
   means for providing second and third redundant control signals for controlling flare of the craft;
   first means for summing the first and third control signals in like senses to provide a first summation signal;
   second means for summing the second and fourth control signals in like senses to provide a second summation signal;
   means connected to the first and second summing means and to the aircraft for controlling the craft in response to the first and second summation signals when landing the craft;
   means for summing the third and fourth control signals in opposite senses to provide a third summation signal;
   means for providing a first reference signal;
   means for comparing the first reference signal and the third summation signal to provide a first comparison signal;
   means for summing the second and third summation signals in like senses and the first summation signal in an opposite sense to provide a fourth summation signal;
   means for providing a second reference signal;
   means for comparing the second reference signal and the fourth summation signal to provide a second comparison signal; and
   alarm means connected to the means for providing the first comparison signal and to the means for providing the second comparison signal, and being actuated when at least one of the first and second comparison signals exceeds predetermined limits.

* * * * *